May 28, 1929.  J. W. HEARN  1,715,235
COMBINED FARMING MACHINE
Filed Jan. 8, 1926  3 Sheets-Sheet 2
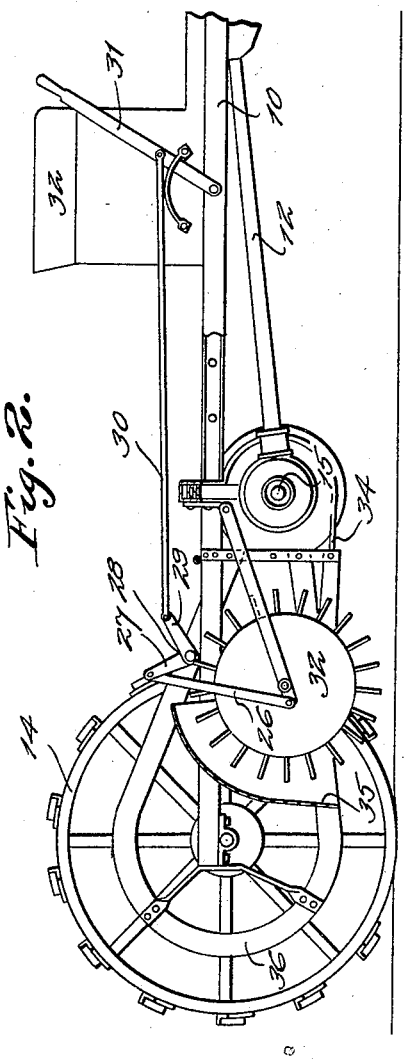
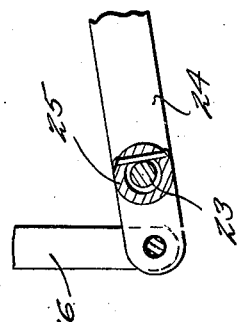
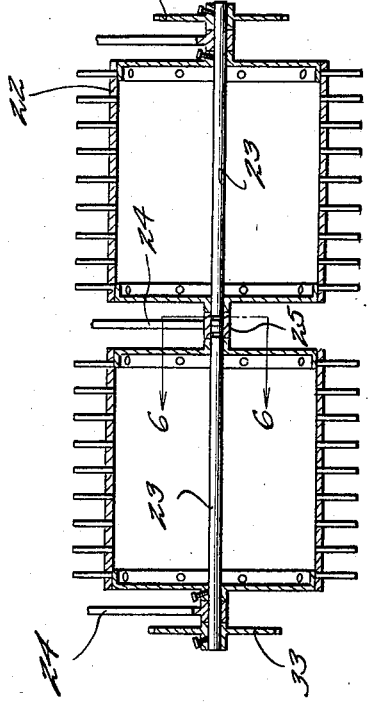
James W. Hearn
INVENTOR

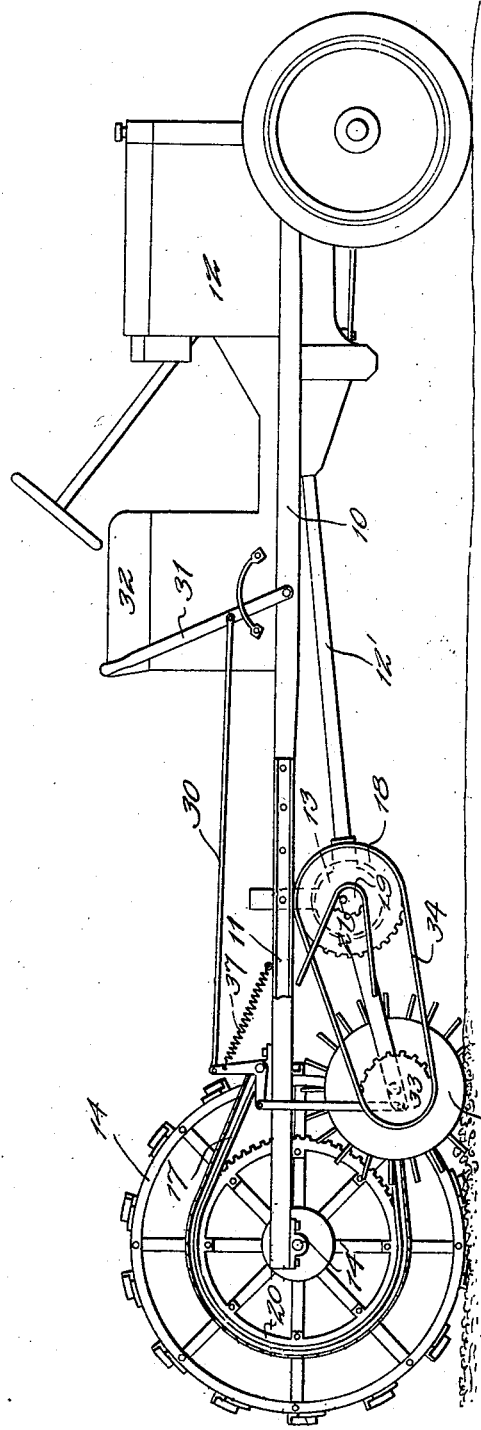

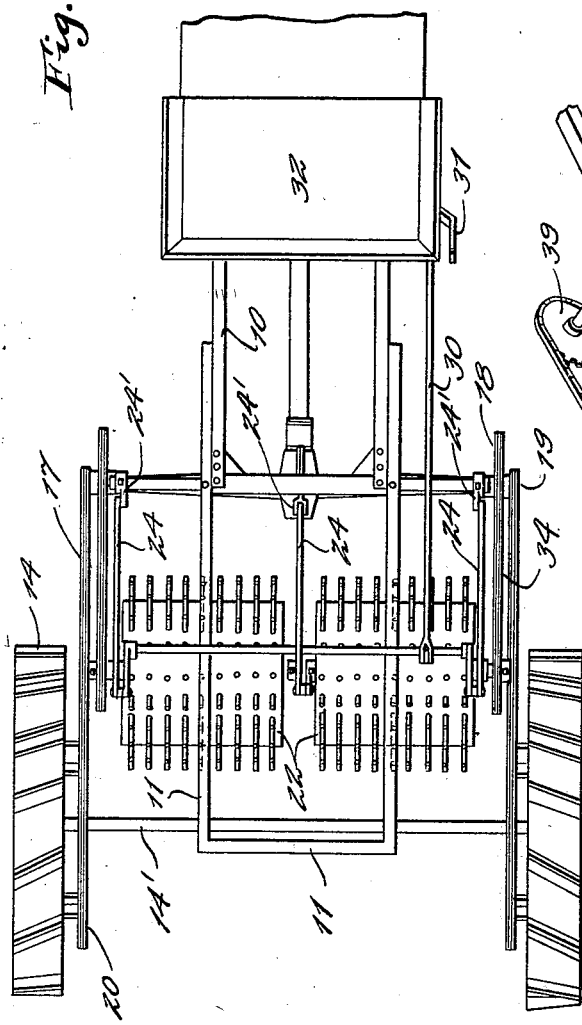
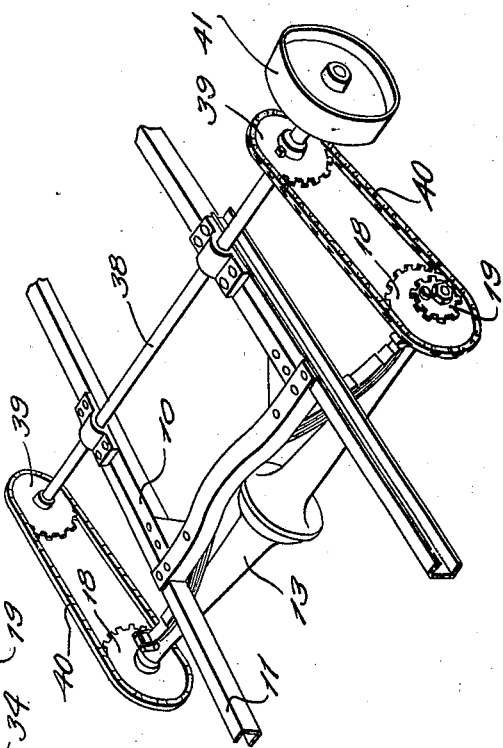

Patented May 28, 1929.

1,715,235

UNITED STATES PATENT OFFICE.

JAMES WILLIAM HEARN, OF WATERTOWN, TENNESSEE, ASSIGNOR OF ONE-HALF TO W. H. BASS, OF WATERTOWN, TENNESSEE.

COMBINED FARMING MACHINE.

Application filed January 8, 1926. Serial No. 80,044.

My present invention comprehends the provision of a machine which may be successfully employed for various purposes on a farm or the like.

My improvement contemplates the employment of a motor driven wheeled frame which in itself constitutes a tractor that may be used for hauling, pulling, etc., but which is designed to have associated therewith and driven thereby a large assortment of devices or implements employed in farming.

The improvement further contemplates an auxiliary wheeled frame which is designed to be secured to the frame of an ordinary motor driven vehicle, and which is extended therebetween and the wheels thereof rotated by the drive axles or shafts of the machine, the wheels of the latter being removed, the said auxiliary frame designed to have removably supported thereon a mill, crusher, a thresher, a seeder, a fertilizer distributor, etc., all of which are driven by the rear axles of the tractor proper, and which, when removed therefrom, permits the device being employed as an ordinary tractor, while there is further removably associated with the device a cotton chopper, a soil pulverizer and a hay tedder.

A still further object is the provision of a motor operated wheeled frame, which embodies among other features a plurality of toothed cylinders adapted to be rotated from a driven shaft, together with means for raising or lowering the cylinders with relation to the ground as occasion may require, so that the said cylinders may be employed as ground pulverizers, hay tedders, or wherein the elements constituting the cylinders may be moved in spaced relation with respect to each other so that the device may be successfully employed as a chopper for cotton or other vegetation.

The nature and advantages of the invention will be better understood when the foregoing description is read in connection with the drawings, the invention further residing in the construction and arrangement of parts as claimed.

In the drawings forming part of this application, like numerals of reference indicate similar parts in the several views, and wherein:

Figure 1 is a side elevation of the machine forming the subject matter of the present invention, parts being broken away, and showing the toothed cylinders in active position.

Figure 2 is a similar view showing the toothed cylinders raised above the ground.

Figure 3 is a fragmentary top plan view.

Figure 4 is a fragmentary perspective view of the auxiliary frame illustrating the drive connection between the motor operated shaft and the shaft on the said auxiliary frame.

Figure 5 is a sectional view through the cylinders to show how they are mounted.

Figure 6 is a detail sectional view on the line 6—6 of Figure 5.

Figure 7 is a detail sectional view showing how the combined sprocket and pulley wheels are mounted.

Figure 8 is a detail sectional view showing the cylinder sections separated, as when the device is employed as a cotton chopper.

Referring to the drawings in detail, 10 represents the frame of an ordinary motor driven vehicle. The rear or drive wheels of the motor frame are removed, and secured to the said frame 10, at the rear thereof, there is an auxiliary frame 11 which forms a continuity of the frame 10, as shown in Figures 1, 2 and 3. The drive shaft from the motor 12 is received through the usual drive shaft housing 12', while between the axles and the drive shaft there is the usual differential, the said differential and axles being housed in the usual manner, as indicated by the numeral 13. As stated, the drive wheels of the machine are removed, but tractor wheels 14 are fixed on the ends of a shaft 14' which is journaled in suitable bearings 16 fixed to the under face at the said rear end of the auxiliary frame 11. The spindle ends of the axle in the housing 13 are indicated by the numerals 15, and freely journaled on the reduced or hub ends 13' of the housing 13 there are sprocket wheels 18 which have an inner continuous flange 18' in the nature of a pulley. Fixedly secured on each of the spindles 15 there is a sprocket wheel 19 having its inner or body portion round and comparatively wide, as indicated by the numeral 19'. Spring influenced means, broadly indicated by the numeral 21, are carried by the combined sprocket and pulley wheel 19 and engage an opening in the combined sprocket and pulley wheel 19, locking these elements together. This is clearly illustrated by Figure 7 of the drawings. Trained around the sprocket wheels 19 and around sprocket wheels 20 which are fixed on the shaft 14', there are endless chains 17. By this arrangement it will be noted that the tractor wheels 14 are revolved by the motor 12.

Toothed cylinders 22 are mounted on shafts 23. These cylinders may be arranged either to the front or to the rear of the tractor wheels 14. The shafts 23 are arranged end to end and are journaled in parallel members 24 that are hung from brackets 24' which are fixed to the forward end of the auxiliary frame 11. Rising from the pivotally supported frame for the cylinders 22 there is an arm 26, which is connected with one branch 27 of a bell crank lever 28, the other branch 29 of which is connected with a rod 30 which is actuated through the instrumentality of a hand lever 31 disposed adjacent to the seat 32 of the vehicle. Manifestly the lever 31 is disposed within convenient reach of the driver so that the cylinders 22 can be conveniently raised or lowered with relation to the ground. The shafts 23 are provided with sprocket wheels 33 that have trained therearound and also around the sprockets 18 endless chains 34, whereby the cylinders are rotated. It will be noted upon inspection of Figure 2 that guards 35 are arranged adjacent to the toothed cylinders 22 and that the endless chains 17 are concealed in guards 36. Connected with the bell crank lever and with the frame 11 there is a spring 37 to assist in moving the cylinders 22 away from the ground.

If desired, and as illustrated in Figure 4 of the drawings, a shaft 38 may be journaled transversely of the frame, and equipped with sprocket wheels 39 over which and the sprocket wheels 18 of the axles are trained chains 40, thereby rotating the shaft 38 and utilizing the power so developed for driving machinery from a belt wheel 41 on the said shaft 38. The pulley wheels 19' or 18' may be also utilized for this purpose.

The pulley wheel 18', associated with the sprocket wheels 18, may be utilized for driving agricultural machines, such for instance, a threshing machine, seeders, fertilizer distributors and any other similar devices which are removably mounted on the auxiliary frame. In these instances, the toothed carrying cylinders are removed from the device, or if desired, the same may be held above ground contacting engagement, as disclosed in Figure 2 of the drawings. When the machinery is removed from the frame the device may be employed as an ordinary tractor.

Because of the varying diameters of the sprocket wheels between the driven and the drive sprockets for the cylinders, the said cylinders will be caused to rotate with great rapidity, so, from experience I have found that the teeth of the cylinders will fully enter the ground, and, as a matter of fact, the lower portion of the said cylinders will also enter the ground. In this manner dirt and weeds are dug up and thrown to the rear of the machine. As the dirt is heavier than the weeds or roots the same will first reach the ground so that the roots will be exposed thereover and permitted to rot by exposure. Thus our machine provides an ideal machine for pulverizing and treating soil to render the same in a proper condition for planting.

In Figures 3 and 5 of the drawings I have illustrated the shafts 23 as provided each with a single cylinder 22, but, as disclosed by Figure 8 of the drawings each cylinder 22 is preferably made up of any desired number of wheel-like sections 42. The hubs 43 of these sections are secured upon the shafts 23' by bolt members 44. By such arrangement it will be noted that the sections 42 may be brought against each other and locked to the shaft, or as disclosed by the said Figure 8, may be arranged in close relation with respect to each other. When the sections are arranged, as in Figure 8, the teeth of the wheels or cylinders will operate between grown plants and the device when so arranged produces an ideal cotton chopper.

While it is believed that from the foregoing description the nature and advantages of the invention will be readily apparent, it is to be understood that the improvement is not to be limited to the construction herein shown and described, and that such changes may be resorted to when desired as fall within the scope of what is claimed.

Having thus described the invention, what is claimed as new, is:—

The combination with a wheeled frame including a crossed member and a driven shaft, of spaced brackets mounted on said cross member, an auxiliary frame including spaced side members and an intermediate member having their corresponding ends pivoted on the adjacent brackets, and disposed beneath the main frame, shafts journaled in the members of the auxiliary frame, toothed cylinders mounted on said shafts and arranged to operate between the wheels of the main frame and directly in advance of the axle thereof, means for rotating said shafts from said driven shaft, a curved vertical guard arranged at the rear of the toothed cylinders and partly projecting over the latter, a bell crank lever pivoted on the main frame, an arm pivotally connected with one branch of the bell crank lever and with said auxiliary frame, means connected with the other branch of the bell crank lever, whereby the latter can be operated to raise and lower said auxiliary frame, and a coil spring terminally connected with the main frame and the last mentioned branch of the bell crank lever to assist in raising the auxiliary frame.

In testimony whereof I affix my signature.

JAMES WILLIAM HEARN.